April 23, 1968 K. E. STANLEY 3,378,972
STUD WITH A PERFORATED ANCHORING SHEET
Filed Aug. 10, 1964 2 Sheets-Sheet 1

Inventor
Kenneth Ernest Stanley
By Cushman, Darby & Cushman
Attorneys

April 23, 1968   K. E. STANLEY   3,378,972
STUD WITH A PERFORATED ANCHORING SHEET
Filed Aug. 10, 1964   2 Sheets-Sheet 2

Inventor
Kenneth Ernest Stanley
By Cushman, Darby & Cushman
Attorneys

United States Patent Office 3,378,972
Patented Apr. 23, 1968

3,378,972
STUD WITH A PERFORATED
ANCHORING SHEET
Kenneth Ernest Stanley, 86 Wendover Road,
Aylesbury, England
Filed Aug. 10, 1964, Ser. No. 388,633
Claims priority, application Great Britain, Aug. 13, 1963,
31,991/63; Feb. 26, 1964, 8,048/64
5 Claims. (Cl. 52—309)

According to the present invention, there is provided a stud comprising a metal shank a metal sheet having one major surface adjacent to an end face of said shank and serving as the head of said stud, means welding said shank to said sheet at said end face, and portions of said sheet spaced from said means defining holes in a major surface of said sheet.

In order that the invention may be clearly understood and readily carried into effect, reference will now be made, by way of example, to the accompanying drawings, wherein.

Figure 1:
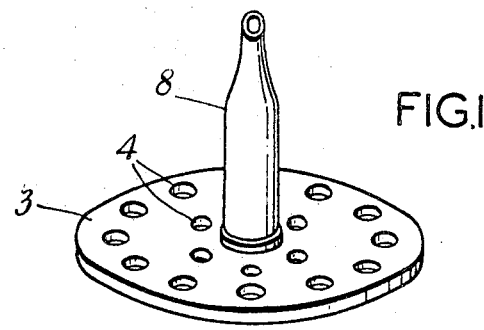
FIGURE 1 shows a perspective view from above of a stud fitted with a protective sleeve.
Figure 2:
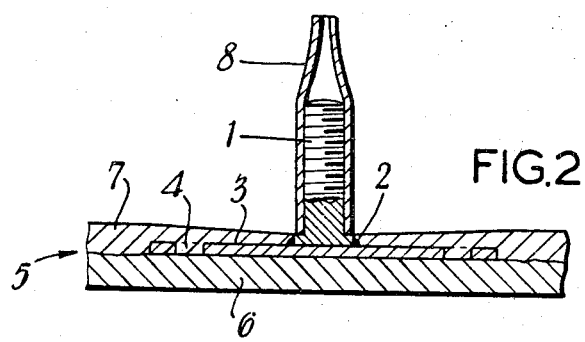
FIGURE 2 shows an axial sectional view through the stud, the sleeve and a member in which the stud has been embedded.

Referring to FIGURES 1 and 2, the stud consists of an externally screw-threaded metal shank 1 which is welded at 2 to a major surface of a perforated, circular metal sheet 3 serving as a head for the stud. The shank and sheet may be arc welded or capacitor discharge welded to one another, and the sheet may be drilled to provided the perforations 4 therein. The perforations are in the form of full circles, the material displaced to form them being completely removed from the sheet. The stud can either be bonded to a surface of a member, or be embedded in a member. In either case, it serves to connect the member to another member.

With regard to FIGURE 2, which shows the stud embedded in a fiber-glass laminate, member 5, in the operation of embedding the stud in the member, a gel coat is applied to a mould in the usual way and allowed to set. Onto the first fiber-glass/polyester laminate layer 6, the head of the stud is pressed so that the excess resin comes through the perforations 4. One or more layers, such as layer 7 are then added to build up to the required thickness, and the resin is allowed to cure thoroughly before a load is applied to the stud. A thread-protecting sleeve 8, which has been fitted over the screw-threaded shank throughout the embedding operation, is removed only after all wet processes have been carried out.

Figure 3:
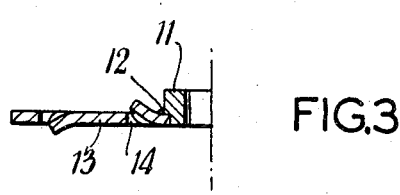
FIGURE 3 shows half of an axial section through a modified version of the stud and taken on the line III—III in FIGURE 4.
Figure 4:
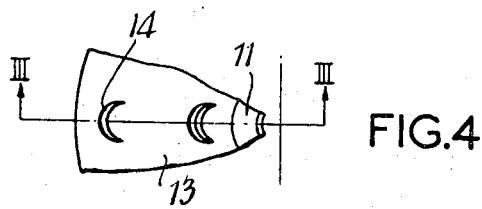
FIGURE 4 shows a fragmentary plan view of the modified version.

Referring to FIGURES 3 and 4, the stud shank takes the form of a hexagonal nut 11 which is welded at 12 to a centrally apertured circular sheet 13. The perforations 14 in the sheet, apart from the central aperture, are half-pierced, i.e. the metal displaced to form the perforations remains attached to the sheet while however, projecting upwardly or downwardly from the sheet. The projecting portions form barbs which help to keep the head of the stud securely in fibrous material such as fiber-glass, or in the dough moulding material, in which the head of the stud is to be embedded.

Figure 5:
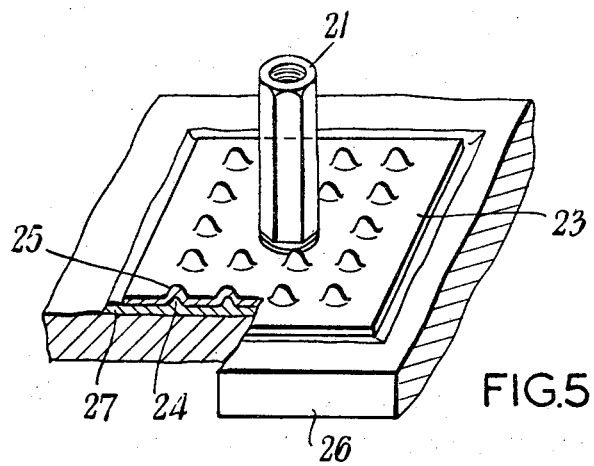
FIGURE 5 shows a partly sectional perspective view from above of another modified version of the stud bonded to a surface of a member.

Referring to FIGURE 5, the shank (now reference 21) is longer than in FIGURES 3 and 4, for example it may be about 1 inch long, but is still internally screw-threaded and externally hexagonal in cross-section. Moreover, the head, which is welded to the shank, is a rectangular metal sheet 23 formed with holes 24 which are not in this case perforations but are recesses at one major surface of the sheet, there being corresponding projections 25 at the other major surface.

FIGURE 5 shows the stud bonded to the surface of a member 26. To carry out the bonding a small amount of epoxy resin with added hardener is spread as at 27 on to a well cleaned part of the surface, and the stud lower major surface of the sheet 23 is pressed onto the resin, some of the resin passing into the dimples 24 to key the sheet 23 to the memebr 26. The resin is allowed to cure thoroughly before a load is applied to the stud.

Instead of the shank 1 of FIGURES 1 and 2 being externally screw-threaded, it can be a plain shank, in which case the sleeve 8 is not needed.

If desired, the sheet forming the head may be of flattened expanded metal. More than one shank may be welded to the same major surface of the metal sheet, or shanks may be welded to the sheet on opposite major surfaces thereof. In this latter case two shanks welded to opposite sides of the sheet may be co-axial.

The stud described may be used by embedding the perforated sheet metal head in plastics material, for example when moulding resin bonded fiber-glass car bodies, boat hulls or building panels.

Alternatively, the perforated sheet can be embedded in plastics material in such manner as to produce a stud having a plastics head reinforced by a perforated metal sheet. The plastics material in which the head is embedded can be plain or patterned. The stud just described is suitable for securing a curved sheet of material to battening.

The holes formed in the head of the stud can be geometrically or randomly disposed and can be of any shape, although they are advantageously circular.

Instead of being welded to the sheet, the shank could be swaged or otherwise fixed to the sheet.

In general, the thickness of the sheet is preferably less than 1/10 of an inch, advantageously between .03 and .05 of in inch. The size of the sheet depends to some extent upon the diameter of the shank. For example, in the case of a 1/4 inch diameter shank, the sheet is approximately 1½ inches across. The length of the stud is advantageously between ½ inch and 2 inches.

Figure 6:
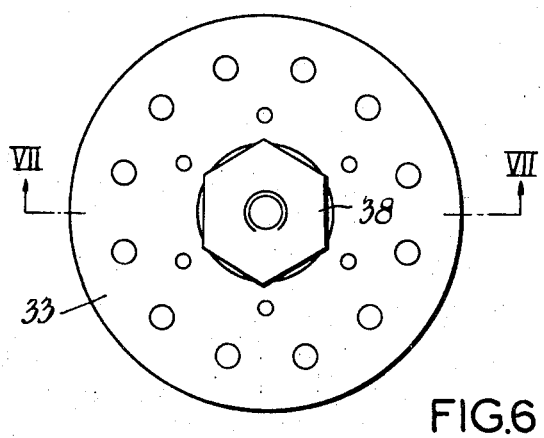
FIGURE 6 is a plan view of a modified version of the invention.
Figure 7:
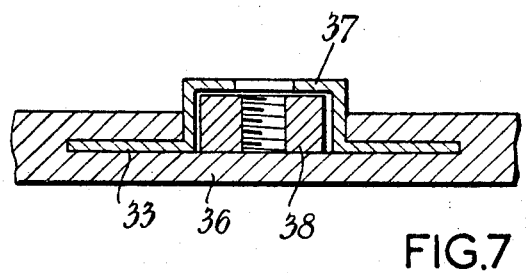
FIGURE 7 is a sectional side elevation view taken substantially along the line VII—VII of FIGURE 6.

Referring to FIGURES 6 and 7, which show a further modified version of the stud, the stud being seen embedded in a member 36 in FIGURE 7, the shank consists of a top-hat section piece 37 and a nut 38 force-fitted into the piece 37 in such manner that the corners of the nut bite into the metal of the piece 37 and retain the nut therein. The piece 37 is integral with the plate 33 and is formed therein by deep-drawing.

I claim:
1. A stud comprising a metal shank, a metal sheet having one major surface adjacent to an end face of said shank and serving as the head of said stud, means welding said shank to said sheet at said end face, portions of said sheet spaced from said means defining perforations having outlines of part circles and formed through said sheet from said one major surface to the other major surface of said sheet, and projecting portions projecting beyond a major surface of said sheet and produced by displacement of material of said sheet to form said perforations, said perforations adapted to receive a polymerizable material therethrough to bond layers of a laminate comprising said polymerizable material, said layers of said laminate being contiguous with said major surfaces of said sheet, and fastening means on said shank for fastening an article to said shank.

2. In combination, a member consisting of a plurality of layers of fibrous material and resin, a metal stud shank, a stud head in the form of a metal sheet embedded between two adjacent layers of said member and having one major surface adjacent to an end of said shank, means welding said shank to said sheet at said end, portions of said sheet spaced from said means defining perforations through said sheet from said one major surface to the other major surface of said sheet and having said resin extending therethrough, and fastening means on said shank for fastening an article to said shank.

3. A combination according to claim 2, wherein said perforations have outlines of full circles.

4. A combination according to claim 2, wherein said fastening means comprises external screw-threading on said shank.

5. A combination according to claim 2, wherein said shank is hollow and said fastening means comprises internal screw-threading bonding the hollow.

References Cited

UNITED STATES PATENTS

| | | | |
|---|---|---|---|
| 855,129 | 5/1907 | Plym | 52—713 X |
| 1,072,361 | 9/1913 | Rickman | 52—708 X |
| 1,762,254 | 6/1930 | Zarba | 52—714 X |
| 1,973,951 | 9/1934 | Goldenberg | 85—9 |
| 2,087,113 | 7/1937 | Owen | 151—41.7 X |
| 2,386,887 | 10/1945 | Eckel | 52—715 X |
| 2,389,964 | 11/1945 | Eckel | 52—715 |
| 2,389,965 | 11/1945 | Eckel | 52—508 X |
| 2,580,231 | 12/1951 | Lamm | 52—714 X |
| 2,793,887 | 5/1957 | Moore | 52—484 X |
| 3,246,439 | 4/1966 | Foster | 52—714 X |

JOHN E. MURTAGH, *Primary Examiner.*